United States Patent
Chen

(10) Patent No.: US 6,962,500 B1
(45) Date of Patent: Nov. 8, 2005

(54) ELECTRICAL CARD CONNECTOR

(75) Inventor: Chiu-Kuei Chen, Hsinchuang (TW)

(73) Assignee: Jess-Link Products Co., Ltd., Taipei (TW)

( * ) Notice: Subject to any disclaimer, the term of this patent is extended or adjusted under 35 U.S.C. 154(b) by 0 days.

(21) Appl. No.: 10/972,383

(22) Filed: Oct. 26, 2004

(51) Int. Cl.[7] ............................................. H01R 13/62
(52) U.S. Cl. ..................................................... 439/159
(58) Field of Search ................................. 439/159, 157, 439/152–156, 607, 946, 923; 361/756, 759, 361/681, 686, 683; 379/433.09

(56) References Cited

U.S. PATENT DOCUMENTS

| | | | | |
|---|---|---|---|---|
| 6,482,020 B1 * | 11/2002 | Yeh | ............................ | 439/159 |
| 6,572,392 B2 * | 6/2003 | Motojima | .................... | 439/159 |
| 6,648,694 B2 * | 11/2003 | Takamori et al. | ........... | 439/630 |
| 6,655,973 B2 * | 12/2003 | Ji et al. | ........................ | 439/159 |
| 6,729,894 B2 * | 5/2004 | Ooya et al. | .................. | 439/159 |
| 6,814,596 B2 * | 11/2004 | Yu et al. | ...................... | 439/159 |
| 6,839,431 B2 * | 1/2005 | Ooya et al. | ............. | 379/433.09 |
| 6,875,034 B1 * | 4/2005 | Su et al. | ...................... | 379/159 |
| 2001/0055897 A1 * | 12/2001 | Nogami | ....................... | 439/159 |
| 2003/0032317 A1 * | 2/2003 | Ooya et al. | .................. | 439/159 |

* cited by examiner

*Primary Examiner*—Alexander Gilman
(74) *Attorney, Agent, or Firm*—Rosenberg, Klein & Lee

(57) ABSTRACT

An electrical card connector, in which a shielding member introduced therein has a latch, and an against portion used for abutting against a guide rod of a ejector and a top of an fixing end of the guide rod, respectively, so as to limit an upward displacement of the guide rod. This configuration can prevent the guide rod from shaking up and down; the guide rod is thus securely fixed. On the other hand, the guide rod further includes a protrusion slideably mating with a corresponding groove of an insulating housing, which make the slider slide reliably in a front-to-back direction. Moreover, a guide groove of the slide rod is mated with a guide rib of the insulating housing so as to make the slider slide stably on the insulating housing. Thereby, the electrical cards can be inserted or ejected stably and smoothly.

7 Claims, 6 Drawing Sheets

ELECTRICAL CARD CONNECTOR

BACKGROUND OF THE INVENTION

1. Field of the Invention

The present invention relates to an electrical card connector, and more particularly to an electrical card connector mounted on a Printed Circuit Board (PCB) for retaining an electrical card therein.

2. Description of Related Art

Recently, electrical cards are widely used in the field of electronic appliances. Such electrical card connectors are adapted to connect the electrical cards to the appliances. The electrical card connectors are mounted on a PCB of the appliances and the electrical cards retained therein, so that information can be transferred therebetween.

Referring to FIG. 1, a conventional electrical card connector is shown, which includes an insulating housing 1, a plurality of conductive terminals 2, and an ejector 3. The insulating housing 1 has a base portion 11, a first side arm 12 and a second side arm 13 parallel extending from two ends of the base portion 11, respectively, so as to form a receiving cavity 14 for retaining an electrical card 4.

The conductive terminals 2 are arranged in the base portion 11 of the insulating housing 1. Each of the conductive terminals 2 includes a soldering portion extending from a bottom portion of the insulating housing 1 for electrical connecting to a PCB (not shown), and a contact portion extending through to the receiving cavity 14 for electrical connection to the electrical card 4 introduced therein.

The ejector includes a slider 31, a spring 32, and a guide rod 33 fixed to the slider 31, in which the slider 31 can slide on the insulating housing 1 in a front-to-back direction. The insulating housing has a slide groove 34 therein, and one end (not labeled) of the guide rod 33 is slideably mated with the slide groove 34. The end of the guide rod 33 has two sliding tracks while sliding in the slide groove 34.

For insertion or ejection, the electrical card 4 is pushed along a insertion direction, such that the electrical card 4 pushes the slider 31. The operations of inserting or ejecting the electrical card 4 can be realized by sliding the guide rod 33 along the slide groove 34.

However, in the configuration of the conventional electrical card connector, the slider 31 is likely to shake up and down while sliding along the slide groove 34. The slider 31 thus cannot engage stably with the insulating housing 1. This configuration is likely to become flexible when the shaking is enhanced, which adversely affects the operation of the ejector 3 and the whole electrical card connector.

Furthermore, the slider 31 is slideably disposed on the insulating housing 1, and the slider 31 is likely to shake while being pushed in a front-to-back direction. The electrical card 4 thus cannot be inserted or ejected smoothly, or reliably electrically connected to the electrical card connector.

It is desirable to provide an improved electrical card connector for containing electrical cards that overcomes the above problems.

SUMMARY OF THE INVENTION

An object of the present invention is to provide an electrical card connector, in which an upward displacement of the guide rod is limited and the guide rod is prevented from shaking up and down so as to provide the electrical card connector with a reliable configuration.

Another object of the present invention is to provide an electrical card connector that makes the slider slide on the insulating housing stably so as to make the electrical card slide smoothly in a front-to-back direction.

In order to achieve the objects set forth, an electrical card connector in accordance with the present invention includes an insulating housing having a receiving cavity. The insulating housing comprises a guide rib, a groove, and a plurality of conductive terminals retained in the insulating housing. An ejector includes a slider, a spring, and a guide rod. The slider slideably mates with the insulating housing in a front-to-back direction. The slider has a slide groove therein, and a guide groove in a bottom portion thereof. The guide groove slideably engages with the guide rib. The slider has a protrusion thereon; the protrusion slideably engages with the groove. The spring is introducing between the insulating housing and the slider. A first end of the guide rod is fixing to the insulating housing, and a second end of the guide rod is movably mating with the slide groove. A shielding member is mounted on the insulating housing. The shielding member has a latch and an against point for abutting against the guide rod and a top portion of the first end of the guide rod, respectively.

BRIEF DESCRIPTION OF THE DRAWINGS

Other objects, advantages, and novel features of the present invention will became more apparent from the following detailed description when taken in conjunction with the accompanying drawings, in which.

DETAILED DESCRIPTION OF PREFERRED EMBODIMENTS

Figure 1:
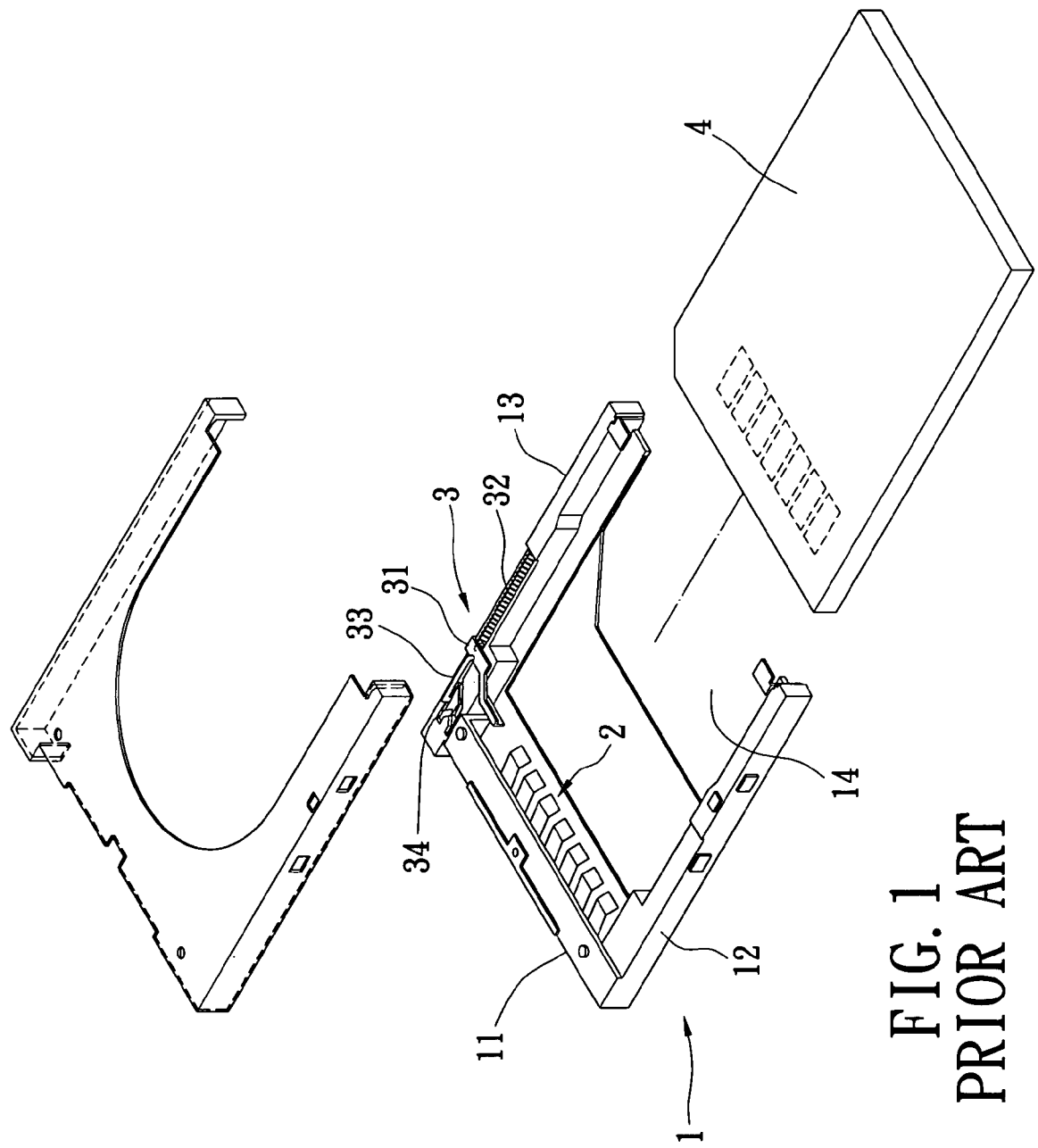
FIG. 1 is a schematic, perspective view of a conventional electrical card connector.
Figure 2:
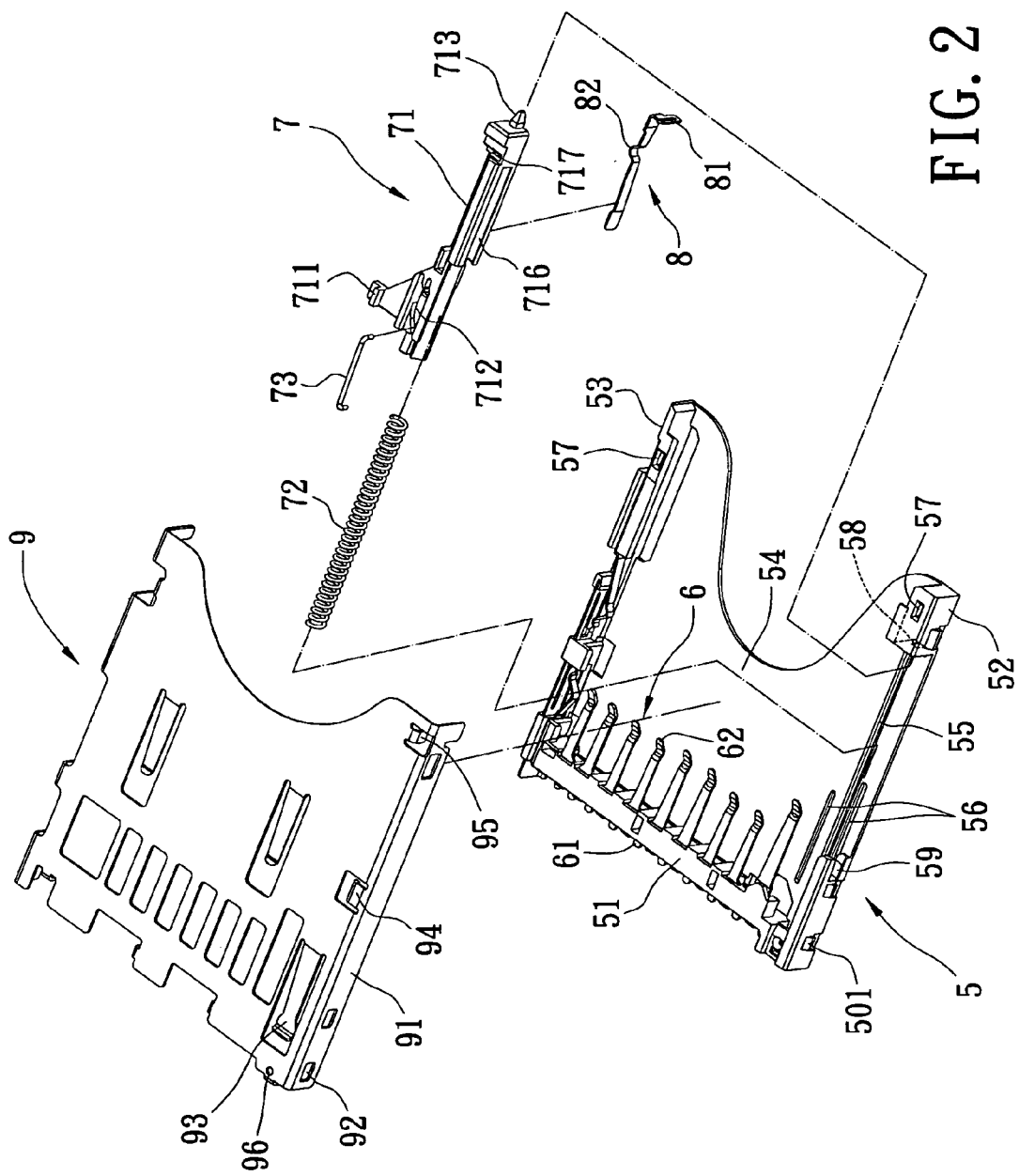
FIG. 2 is a schematic, exploded, perspective view of an electrical card connector according to the present invention.
Figure 3:
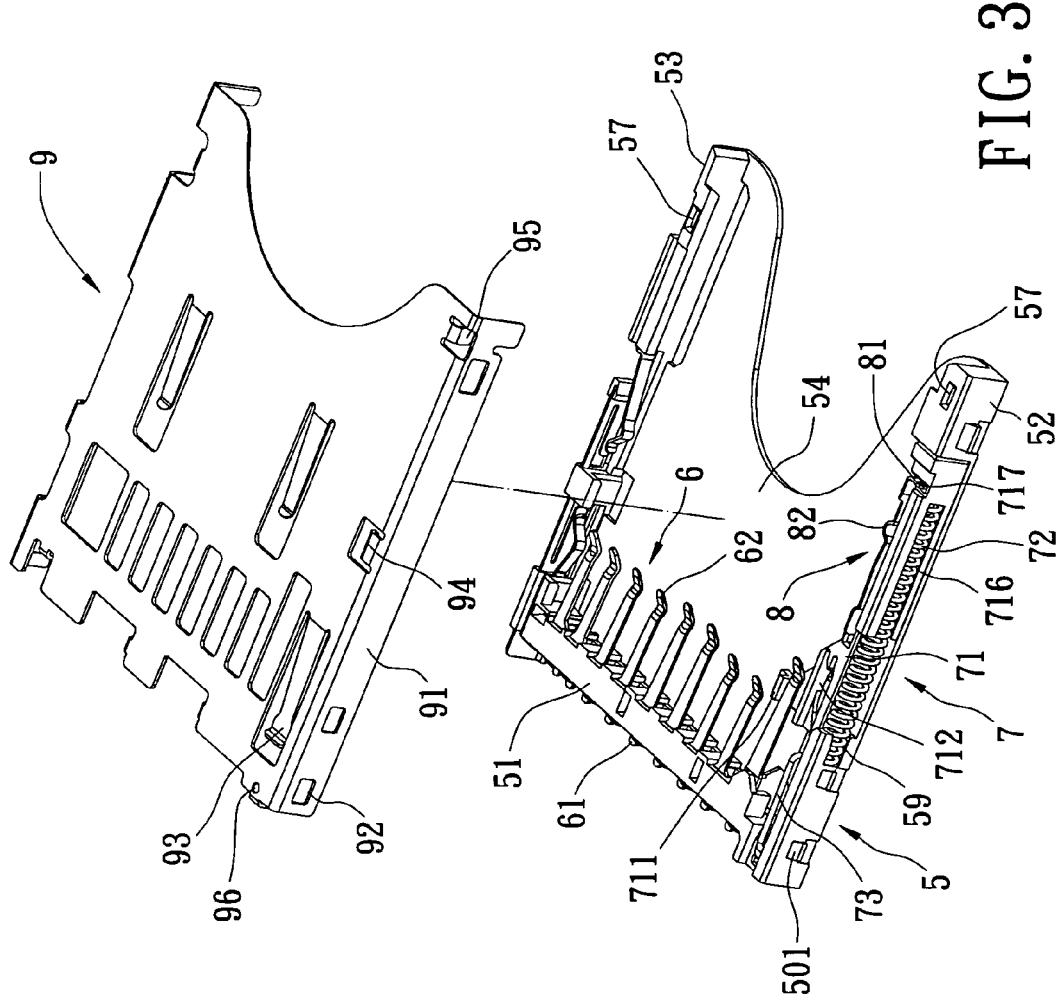
FIG. 3 is a schematic, assembled view of the electrical card connector illustrated in FIG. 2, without a shielding member attached thereto.
Figure 4:
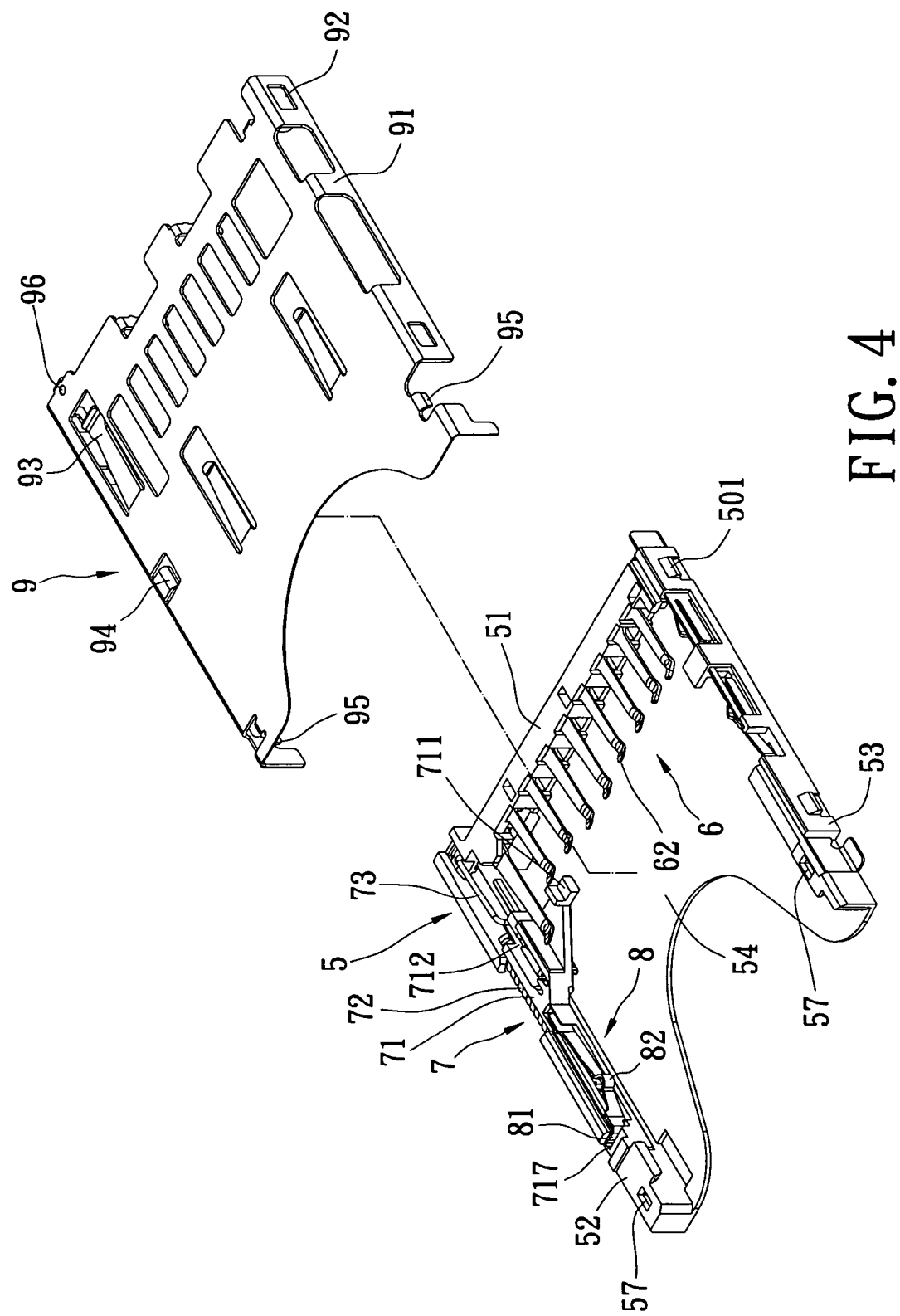
FIG. 4 is a schematic, assembled view of the electrical card connector illustrated in FIG. 2 without a shielding member attached thereto, and shown from another viewing angle.

Referring to FIGS. 2–4, an electrical card connector using used for receiving or ejecting an electrical card in accordance with the present invention is shown. The electrical card connector comprises an insulating housing 5, a plurality of conductive terminals, an ejector 7, a spring switch 8, and a shielding member 9. The insulating housing 5 is made of plastic material, and includes a base portion 51, a first side arm 52 and a second side arm 52 parallel extending from two ends of the base portion 51. The first side arm 51 and the second side arm 52 both are formed in a discontinuous style in this embodiment, but can also be formed in a continuous style. The base portion 51, the first side arm 53, and the second side arm 53 form a receiving cavity 54 therebetween for retaining electrical cards. The insulating housing 5 has a guide rib 55 adjacent to the first side arm 52, and two longitudinal slots 56 disposed at opposite sides of the guide rib 55, respectively. The guide rib 55 and the longitudinal slots 56 extend in a direction relative to insertion or ejection of electrical cards. The first side arm 52 and the second side arm 53 have engaging holes, which are formed in a top of the side arms 52 and 53 adjacent to a front end thereof.

The conductive terminals 6 are made of conductive elastic metal material, which are alternatingly located on the base portion 51 of the insulating housing 5 and extend in the insertion or ejection direction of the electrical card. Each of the conductive terminals 6 includes a soldering portion 61 extending from a bottom portion of the insulating housing 1 for electrically connecting to a PCB (not shown), and a contact portion 62 extending through the receiving cavity 54 for electrically connecting to the electrical cars introduced therein.

Figure 6:
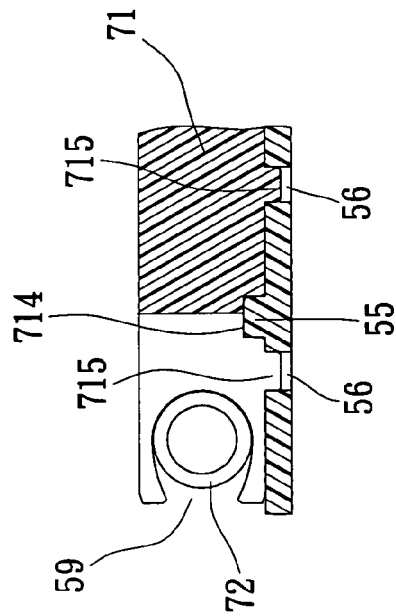
FIG. 6 is a schematic, isometric, assembled view of the present invention, in which a protrusion of the slider is mating with a groove of an insulating housing.

The ejector 7 is engaged with the insulating housing 5. The ejector 7 includes a slider 71, a spring 72, and a guide rod 73. The slider 71 is slideably mated with the first side arm 52 of the insulating housing 5 in a front-to-back direction. The slider 71 has push button 711 extending from a inner side thereon and extending through the receiving cavity 54 for abutting against the electrical card in order to push the slider 7. The slider 71 includes a slider groove 712 formed on a top portion thereof for controlling the sliding track of the slider 71. The slider 71 has a protrusion 713 formed at a front end thereof, and the insulating housing 5 has a groove 58 corresponding to the protrusion 713 for retaining the protrusion 713 (shown in FIG. 6). This configuration can guide the slider 71 to slide stably in a front-to-back direction.

Figure 5:
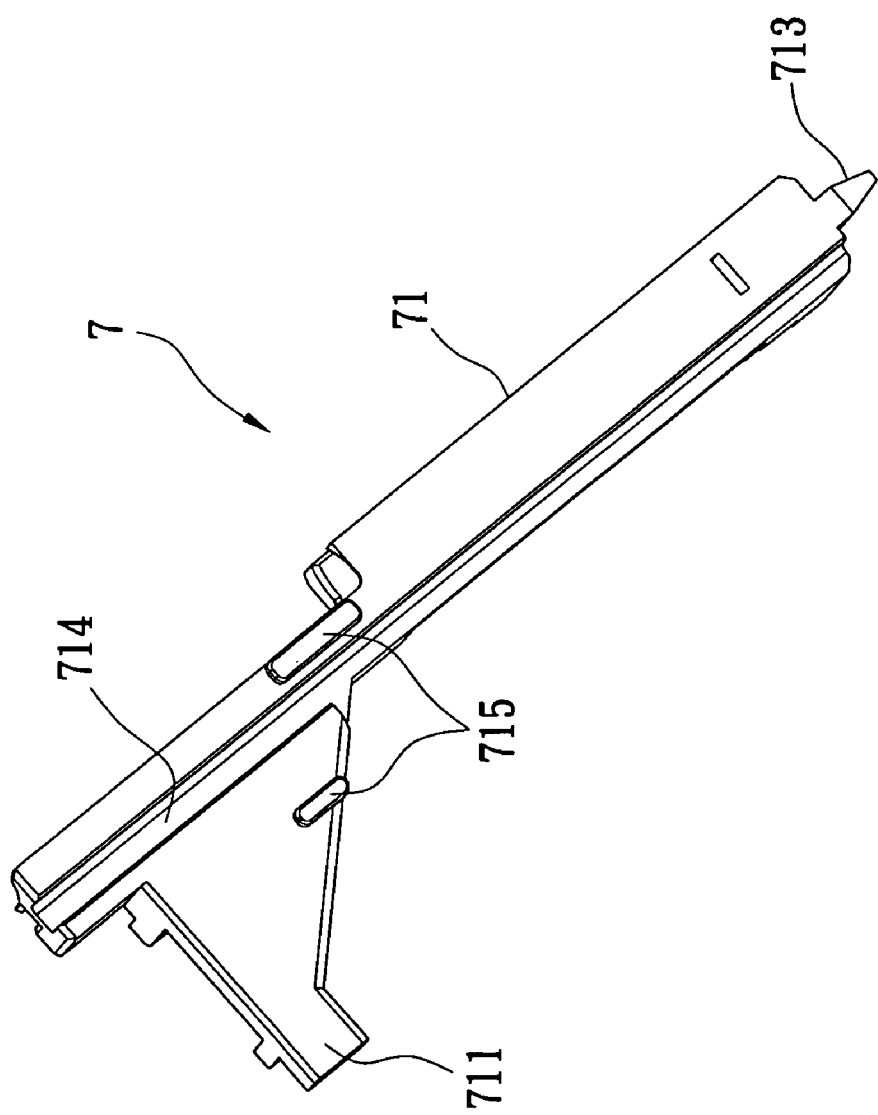
FIG. 5 is a schematic, perspective view of a slider of the electrical card connector in accordance with the present invention.
Figure 7:
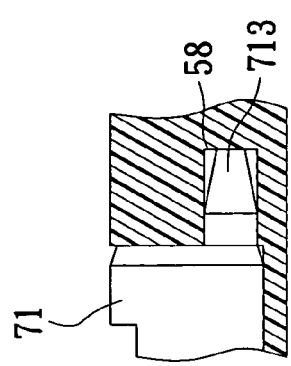
FIG. 7 is a schematic, isometric, assembled view of the present invention, in which a guide groove of the slider is mating with a guide rib of the insulating housing.
Figure 8:
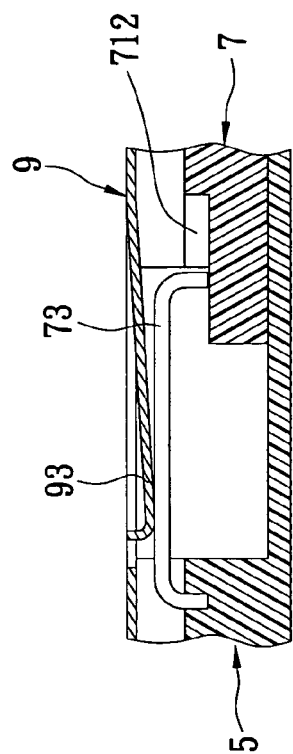
FIG. 8 is a schematic, isometric view of the present invention, in which a latch is abutting against a top margin of a guide rod.

Moreover, the slider 71 has a guide groove 714 (shown in FIG. 5 and FIG. 7) formed on the bottom thereof, which corresponds to the guide rib 55. Two protruding blocks 715 are disposed at both sides adjacent to the guide groove 714 corresponding to the longitudinal slots 56, respectively. The guide groove 714 and the protruding block 715 mate with the corresponding guide rib 55 and longitudinal slot 56, respectively, so as to guide the slider 71 to slide stably on the insulating housing 5 in a front-to-back direction.

Two ends of the spring 72 are retained in and abut against a retaining groove 716 of the slider 71 and a recess 59 of the first side arm 52 of the insulating housing 5, respectively. The spring 72 is arranged between the slider 71 and the insulating housing 5 in order to provide a compression force.

The guide rod 73 has a first free end fixed to the insulating housing 5, and a second free end movably mated with the slide groove 712. The guide rod 73 has two sliding track while sliding in the slide groove 712 so as to form a mechanism to control insertion or ejection of the electrical cards.

The spring switching 8 is made of elastic metal material, and is L-shaped. The spring switching 8 has a fixing portion 81 and a contact portion 82, in which the fixing portion 81 is engaged in an engaging groove 717 of the slider 71 so as to fix the spring switching 8 to the slider 71. The contact portion 82 is extending from the fixing portion 81 and extends through the receiving cavity 54. The contact portion 82 has a free end, and the free end can elastically shake.

The shielding member 9 is made of metal material, and is mounted on the insulating housing 5. The shielding member has two side edges 91 extending from ends thereof, respectively, and each of the side edges 91 includes a plurality of mating holes 92. The insulating housing 5 further includes a plurality fastener 501 disposed at both the outside of the first and second side arm 52 and 53 corresponding to the mating holes 92. The mating holes 92 fasten with the fastener 501, respectively, so as to assemble the shielding member 9 and the insulating housing 5.

Figure 9:
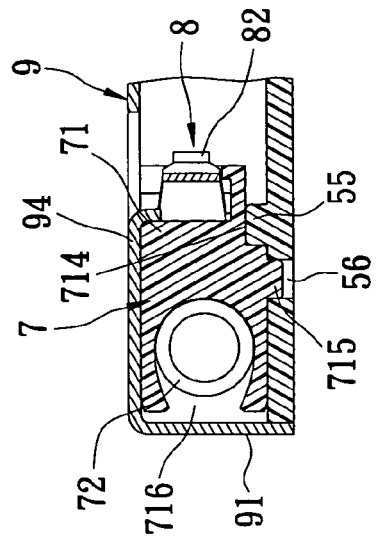
FIG. 9 is a schematic, isometric view of the present invention, in which a tab is abutting against a top margin of the slider.

The shielding member 9 has a latch 93 and an against point 96 on a top portion corresponding to the guide rod 73. The latch 93 has a free end, which extends downwardly into an inner side of the shielding member 9. After assembly, the latch 93 abuts against the top portion of the guide rod 73 (shown in FIG. 9). The against point 96 extends downwardly so as to abut against the top portion of the guide rod 73 for limiting an upward or right-and-left displacement thereof.

The shielding member 9 also is an L-shaped tab 94 disposed upward the slider 71. The tap 94 can elastically compress the top portion of the slider 71 (shown in FIG. 9) for limiting an upward or right-and-left displacement thereof.

The shielding member 9 further comprises two engaging tab 95 extending downwardly into inner side of the shielding member 9 engaging with the corresponding engaging hole 57 of the first and second side arms 52 and 53 so as to fully assemble the electrical card connector.

When an electrical card (not shown) is inserted, the electrical card is pushed forward into the receiving cavity 54. Then, the electrical card compresses the push button 711 so as to push the slider 71. Meanwhile, the guide rod 73 slides in the slide groove 712 so as to retain the electrical card. After that, the conductive portion of the electrical card is electrically connected to the PCB of the electrical card connector by connecting to the contact portions 62 of the conductive terminals 6.

When ejected, the electrical card is pushed in the insertion direction, and the electrical card compresses the push button 711 and pushes the slider 71. The guide rod 73 moves out of the guide groove 712, and the slider 71 disengages the electrical card under force of the compressed spring switching 8.

According to the foregoing description, when compared with the conventional electrical card connector, the electrical card connector according to the present invention has the following advantages:

First, the shielding member 9 introduced therein includes a latch 93, and an against portion 96 used for abutting against a guide rod 73 of an ejector 7 and a top of a fixing end of the guide rod 73, respectively, so as to limit an upward displacement of the guide rod 73. This configuration can prevent the guide rod 73 from shaking up and down. The guide rod 73 is thus securely fixed.

Second, the guide rod 73 further includes a protrusion 713 slideably mating with a corresponding groove 58 of the insulating housing 5, which makes the slider 71 slide reliably in a front-to-back direction. Moreover, the guide groove 714 of the slide rod 73 is mated with the guide rib 55 of the insulating housing 5 so as to make the slider 71 slide stably on the insulating housing 5. The electrical cards can be inserted or ejected stably and smoothly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, comprising:
   an insulating housing having a receiving cavity, wherein the insulating housing comprises a guide rib and a groove;
   a plurality of conductive terminals retained in the insulating housing;
   an ejector having a slider, a spring, and a guide rod, the slider slideably mating with the insulating housing in a front-to-back direction, wherein the slider has a slide groove therein and a guide groove in a bottom portion thereof, the guide groove slideably engaging with the guide rib, and wherein the slider has a protrusion thereof, the protrusion slideably engages with the groove, the spring is introduced between the insulating housing and the slider, a first end of the guide rod is fixed to the insulating housing, and a second end of the guide rod is movably mated with the slide groove; and
   a shielding member mounted on the insulating housing, wherein the shielding member has a latch and an against point for abutting against the guide rod and a top portion of the first end of the guide rod, respectively.

2. The electrical card connector as claimed in claim 1, wherein the insulating housing further comprises a base portion, a first side arm and a second side arm, the first side arm and the second side arm connecting with ends of the base portion, respectively, so as to form a receiving cavity therebetween.

3. The electrical card connector as claimed in claim 1, wherein the insulating housing further comprises two slots disposed at both sides of the guide rib, respectively, the slider further comprising two protruding blocks disposed at both sides of the guide groove, and the protruding blocks slideably mating with the slots, respectively.

4. The electrical card connector as claimed in claim 1, wherein each of the conductive terminals includes a soldering portion extending from the insulating housing, and a contact portion extending through to the receiving cavity.

5. The electrical card connector as claimed in claim 1, wherein the slider further includes a push button formed on and extending from an inner side, the push button extending through to the receiving cavity.

6. The electrical card connector as claimed in claim 1, wherein the shielding member further comprises two side edges extending from ends thereof, respectively, each of the side edges includes a plurality of mating holes, the insulating housing comprising a plurality of fasteners disposed outside and corresponding to the mating holes, and the fasteners engage with the mating holes, respectively.

7. The electrical card connector as claimed in claim 1, wherein the shielding member further comprises a latch extending downwardly into an inner side of the shielding member for abutting against a top margin of the guide rod.

* * * * *